United States Patent
Berry et al.

(10) Patent No.: US 9,684,757 B2
(45) Date of Patent: Jun. 20, 2017

(54) CROSS-HIERARCHY INTERCONNECT ADJUSTMENT FOR POWER RECOVERY

(71) Applicant: International Business Machines Corporation, Armonk, NY (US)

(72) Inventors: Christopher J. Berry, Hudson, NY (US); Ricardo H. Nigaglioni, Austin, TX (US); Haifeng Qian, White Plains, NY (US); Sourav Saha, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/378,404

(22) Filed: Dec. 14, 2016

(65) Prior Publication Data
US 2017/0091370 A1    Mar. 30, 2017

Related U.S. Application Data

(63) Continuation of application No. 15/055,031, filed on Feb. 26, 2016, now Pat. No. 9,552,451, which is a
(Continued)

(51) Int. Cl.
*G06F 17/00* (2006.01)
*G06F 17/50* (2006.01)

(52) U.S. Cl.
CPC ...... *G06F 17/5077* (2013.01); *G06F 17/5072* (2013.01); *G06F 2217/06* (2013.01)

(58) Field of Classification Search
USPC ........................................................ 716/119
See application file for complete search history.

(56) References Cited

U.S. PATENT DOCUMENTS 7,886,240 B2    2/2011  Adkisson et al.
2005/0039156 A1*  2/2005  Catthoor et al. ...... G06F 17/505
                                                716/102
(Continued)

OTHER PUBLICATIONS

Christopher J. Berry, et al., Pending U.S. Appl. No. 14/793,097 entitled "Cross-Hierarchy Interconnect Adjestment for Power Recovery" filed with the U.S. Patent and Trademark Office on Jul. 7, 2015.
(Continued)

*Primary Examiner* — Mohammed Alam
(74) *Attorney, Agent, or Firm* — Cantor Colburn LLP; Bill Porter (57) ABSTRACT

Embodiments relate to cross-hierarchy interconnect adjustment. An aspect includes receiving chip layout data corresponding to a chip design, wherein a first portion of a metal stack of the chip design is assigned to a first hierarchy and a second portion of the metal stack is assigned to a second hierarchy based on a contract between the first and second hierarchy. Another aspect includes determining an unused portion of the first portion of the metal stack. Another aspect includes moving an interconnect of the second hierarchy from the second portion of the metal stack that is assigned to the second hierarchy to the unused portion of the first portion of the metal stack in the chip layout data. Another aspect includes performing power recovery on the chip layout data after moving the interconnect based on an amount of slack margin generated in the chip design by the moving of the interconnect.

1 Claim, 5 Drawing Sheets

Related U.S. Application Data continuation of application No. 14/793,097, filed on Jul. 7, 2015.

(56) References Cited

U.S. PATENT DOCUMENTS

| | | | | |
|---|---|---|---|---|
| 2006/0190900 A1* | 8/2006 | Chan et al. | ......... | G06F 17/5031 716/113 |
| 2009/0079005 A1* | 3/2009 | Haffner et al. | ... | H01L 21/28123 257/368 |
| 2011/0231811 A1* | 9/2011 | Tang et al. | .......... | G06F 17/5036 716/132 |
| 2015/0331985 A1* | 11/2015 | Sharma et al. | ..... | G06F 17/5077 716/122 |
| 2015/0379188 A1 | 12/2015 | Kahng et al. | | |

OTHER PUBLICATIONS

Christopher J. Berry, et al., Pending U.S. Appl. No. 15/055,031 entitled "Cross-Hierarchy Interconnect Adjestment for Power Recovery" file with the U.S. Patent and Trademark Office on Feb. 26, 2016.

List of IBM Patents or Patent Applications Treated as Related (Appendix P), Filed Feb. 10, 2017, 2 pages.

Christopher J. Berry, et al., Pending U.S. Appl. No. 15/378,404 entitled "Cross-Hierarchy Interconnect Adjustment for Power Recovery" file with the U.S. Patent and Trademark Office on Dec. 14, 2016.

* cited by examiner

CROSS-HIERARCHY INTERCONNECT ADJUSTMENT FOR POWER RECOVERY

CROSS-REFERENCE TO RELATED APPLICATIONS

The present application is a continuation application of U.S. application Ser. No. 15/055,031 filed on Feb. 26, 2016, which is a continuation application of U.S. application Ser. No. 14/793,097 filed on Jul. 7, 2015, the contents of which is incorporated by reference herein in their entirety.

BACKGROUND

The present invention relates generally to chip design, and more specifically, to cross-hierarchy interconnect adjustment for power recovery.

Chip design processes, such as system on a chip (SOC) or application specific integrated circuit (ASIC) design, may use a hierarchical approach for distribution of metal resources in the chip among chip components. The entire metal stack, as supported by the fabrication technology that will be used to produce the physical chip, is distributed across various child and parent hierarchies by a contract process. Each hierarchy may be assigned one or more exclusive layers of the metal stack with 100% availability, and also one or more shared portions of the metal stack that are shared across two or more hierarchies. Power recovery is performed on the topology of the chip design before manufacturing in order to lower the overall power consumed by the chip during operation as much as possible. Power recovery may focus on device optimization based on device qualities such as threshold voltage, drive strength, and cell topology, and also balancing performance versus routability in order to place interconnects between devices in the metal stack.

SUMMARY

Embodiments include a method, system, and computer program product for cross-hierarchy interconnect adjustment. An aspect includes: determining a chip layout data corresponding to a chip design the chip layout data comprising a plurality of chip components, a first hierarchy comprising a first subset of the plurality of chip components, and a second hierarchy comprising a second subset of the plurality of chip components; determining metal contracts between the first hierarchy and the second hierarchy, wherein a first portion of a metal stack of the chip design is assigned to the first hierarchy and a second portion of the metal stack is assigned to the second hierarchy based on the contract between the first hierarchy and the second hierarchy; receiving chip layout data and placing the plurality of chip components based on the first hierarchy, the second hierarchy and the contract; routing interconnects between the plurality of chip components by assigning higher-level metal resources to a parent hierarchy and lower-level metal resources to the first hierarchy and second hierarchy, the higher-level metal resources having a first RC value and the lower-level metal resources having a second RC value, the second RC value being larger than the first RC value; determining a timing parameter based on the placement of the plurality of chip components, the assignment of higher-level meter resources and routing of interconnects; determining when the timing parameter is less than or equal to a predetermined threshold; changing the placement of the plurality of chip components and routing of interconnects based on the timing parameter being greater than the predetermined threshold; determining an unused portion of the first portion of the metal stack; moving an interconnect of the second hierarchy from the second portion of the metal stack that is assigned to the second hierarchy to the unused portion of the first portion of the metal stack in the chip layout data, the movement of the interconnect being based on an RC value, slack, congestion, interconnect length and load profile; performing power recovery on the chip layout data after moving the interconnect based on an amount of slack margin generated in the chip design by the moving of the interconnect; and fabricating a physical chip based on the chip layout data after performing the power recovery.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of cross-hierarchy interconnect adjustment for power recovery are provided, with exemplary embodiments being discussed below in detail. The contract-based splitting of interconnect resources between two hierarchies may result in inefficient deployment of interconnect resources across multiple hierarchies. Therefore, cross-hierarchy interconnect adjustment may be performed in conjunction with the power recovery process to make use of unused, relatively fast interconnect resources, increasing the overall speed and reducing power in the chip. Power savings may be increased in the power recovery process by examining and modifying the metal hierarchy contracts.

In order to balance performance and routability concerns during interconnect placement, multiple iterations of negotiation may be performed between parent and child hierarchy owners in order to arrive at the hierarchy contracts. However, even after many such iterations, there may be relatively high speed metal resources that are unused in the chip. For instance, the parent hierarchy may be assigned 100% of a particular metal layer, but may not actually require the entire metal layer. Metal stack resources are relatively slow at the bottom of the metal stack as compared to the top of the metal stack, due to increased resistance at the bottom of the metal stack. Cross-hierarchy interconnect adjustment may reassign these unused, relatively fast interconnect resources that are assigned to a first hierarchy to a second hierarchy that is assigned a slower portion of the metal stack. The power recovery process can thereby recover more power from critical timing path devices in the chip, because use of faster interconnect wires give an increased timing margin. In some embodiments, cross-hierarchy interconnect adjustment may be built into a power recovery engine that is run on a computer and processes the chip layout, or topology, data; in other embodiments, cross-hierarchy interconnect adjustment may be performed separately on the chip topology data, before the power recovery engine processes the chip layout data.

The parent hierarchy of a chip may be assigned the higher-level, i.e., faster interconnect resources. The unused parent-level interconnect resources may be reasonably known in the chip design process, for example, few weeks before design closure. Therefore, in some embodiments, cross-hierarchy interconnect adjustment may be performed few weeks before design closure, such that unused and shared metal stack resources at the parent level are fully or partially used for interconnect upgrade, e.g., reassigning such unused resources to child hierarchies.

Figure 1:
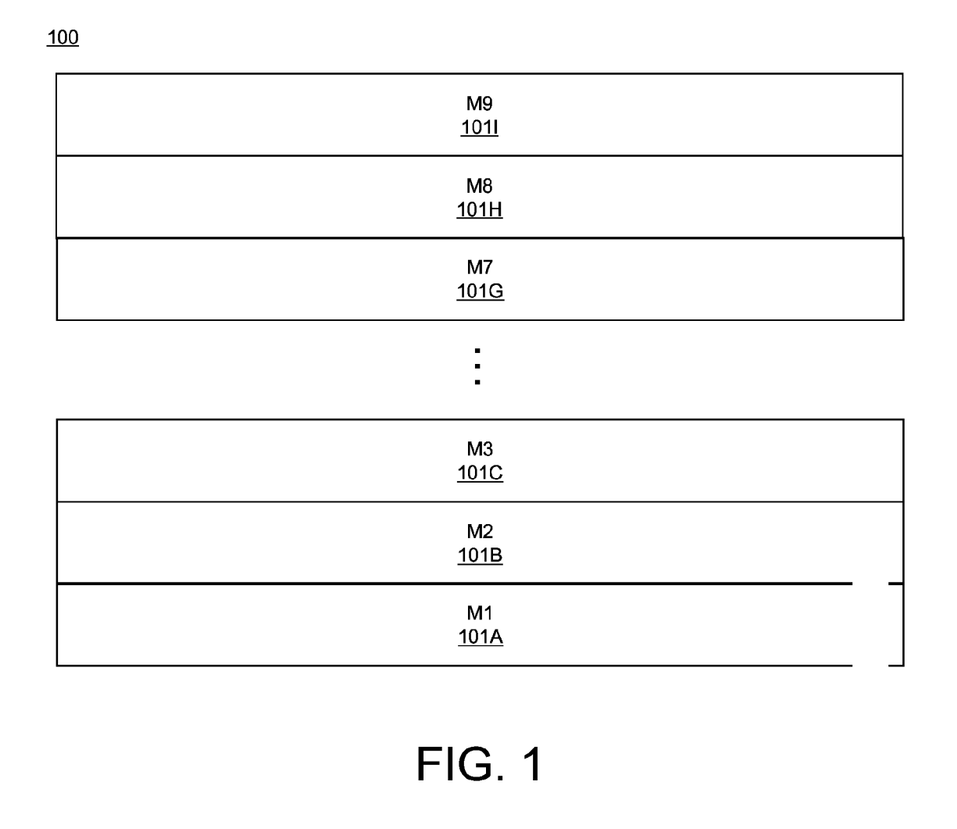
FIG. 1 depicts a metal stack of a chip in accordance with an embodiment.

FIG. 1 illustrates an embodiment of a metal stack 100 for a chip. Metal stack 100 includes a plurality of layers 101A-I, which may also be referred to as M1 to M9. Resistance of the metal layers 101A-I decreases from the bottom of the stack 100 (i.e. layer 101A M1), which has the highest resistance, to the top of the stack (i.e., layer 101I M9). Stack 100 is shown for illustrative purposes only; a metal stack may have any appropriate number of layers.

Figure 2:
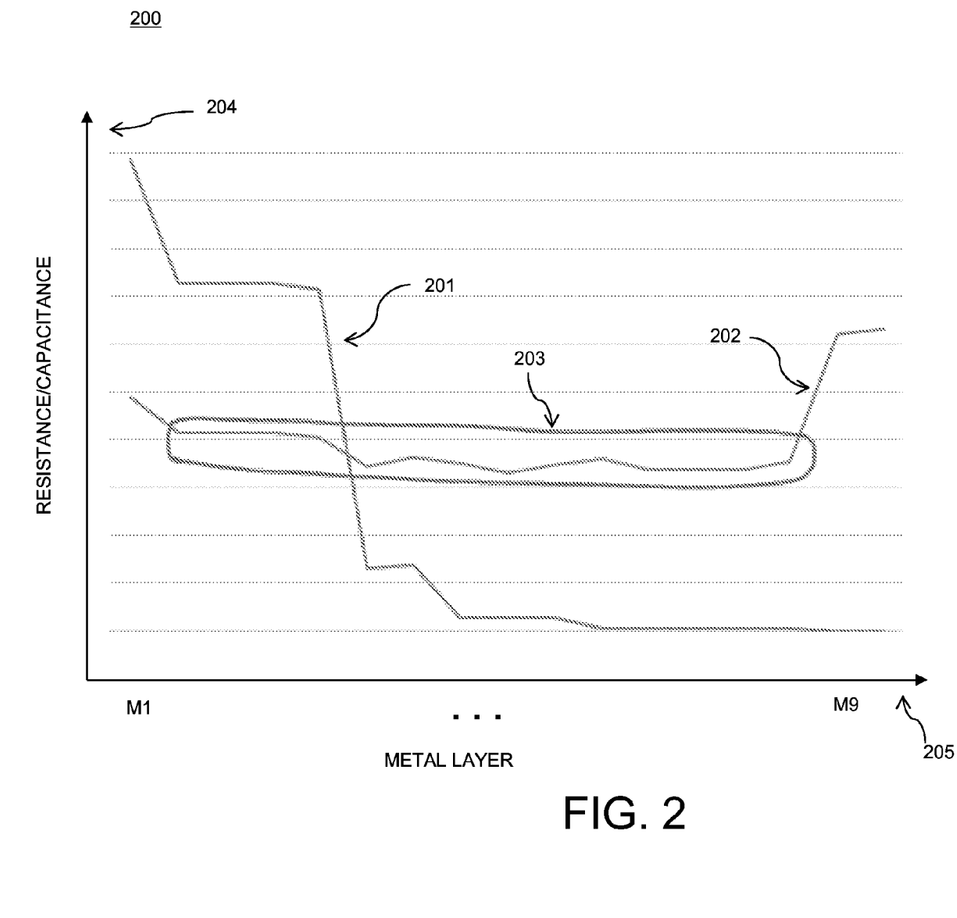
FIG. 2 depicts an example graph of capacitance and resistance through an metal stack in a chip in accordance with an embodiment.

FIG. 2 depicts an example graph 100 of capacitance and resistance through the layers of a metal stack, such as metal stack 100 of FIG. 1, in a chip in accordance with an embodiment. The metal layer increases through metal layers M1 to M9 (as were illustrated in FIG. 1) on the horizontal axis 205, while resistance and capacitance increase on the vertical axis 204. The metal layer resistance (R) is given by line 201, and the metal layer capacitance (C) is given by line 202. Resistance line 201 decreases throughout the metal layers M1 to M9. There is a relatively flat zone 203 in the capacitance line 202, over which the capacitance values remain relatively constant. As shown in FIG. 2, the capacitance profile remains relatively stable (constant) across the metal stack while resistance falls considerably. The interconnect resources are therefore faster higher up in the metal stack because of lower overall RC delay. Flat capacitance zone 203 allows swapping a range of wire-codes with higher layer metal without impacting capacitive interconnect loading. Higher capacitive loading on an interconnect or device impacts timing (e.g., slack/slew fails) and may consume additional power. However, within the flat capacitance zone 203 of the metal stack, connections may be switched to higher layer, lower resistance interconnects to take advantage of the overall lower RC value.

Figure 3:
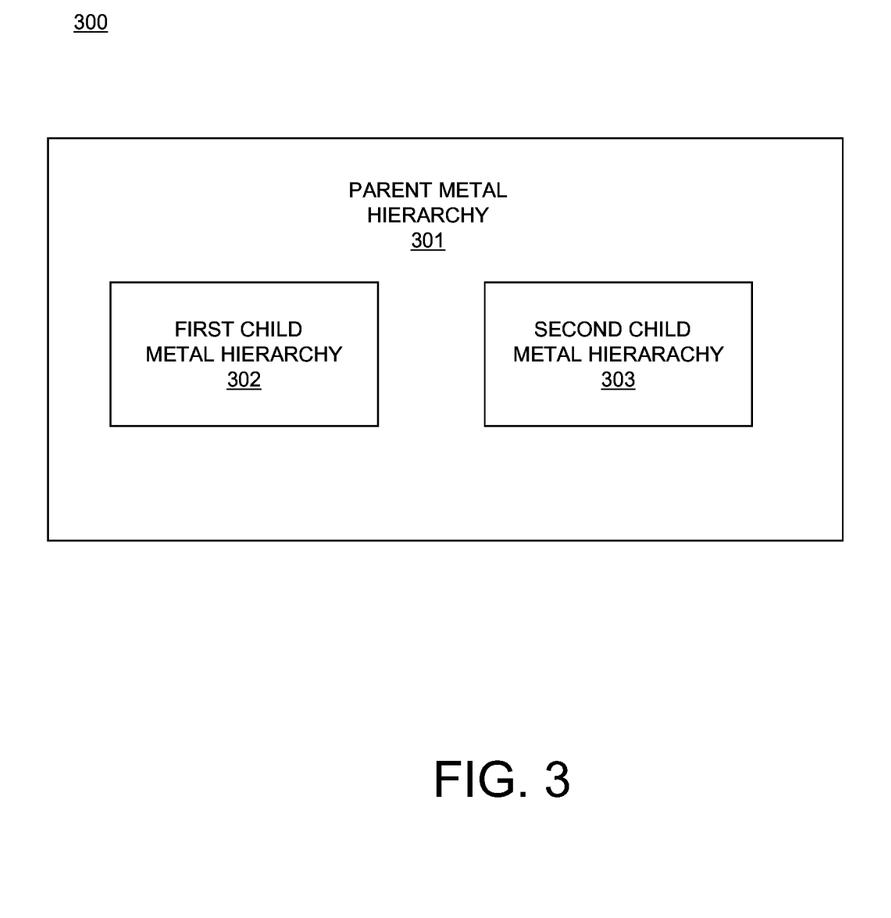
FIG. 3 depicts an example of a metal contract for a chip comprising a parent/first child contract and a parent/second child contract.

FIG. 3 depicts an example of a metal contract 300 for a chip comprising a parent/first child contract and a parent/second child contract. Parent metal hierarchy 301, first child metal hierarchy 302, and second child metal hierarchy 303 each correspond to respective subsets of the overall chip design that require metal resources for interconnects between components. The parent metal hierarchy 301 assigns a subset of the metal stack to each of the first and second child hierarchies 302 and 303, has a contract with respect to each of first child metal hierarchy 302 and second metal hierarchy 303 within their respective subset of the metal stack. However, first child metal hierarchy 302 and second child metal hierarchy 303 have no contract with each other. First child metal hierarchy 302 and second child metal hierarchy 303 attempt to meet performance targets using available interconnect resources defined by their contracts.

An example of a parent/first child contract is illustrated in Table 1, and an example of a parent/second child contract is illustrated in Table 2. As shown in Table 1, for the portion of the metal stack assigned to the parent/first child contract, first child metal hierarchy 302 is assigned 100% of metal layers M1, M2, M3, and M4, and 80% of metal layers M5 and M6; and parent metal hierarchy is assigned 20% of metal layers M5 and M6, and 100% of metal layers M8 and M9. As shown in Table 2, for the portion of the metal stack assigned to the parent/second child contract, second child metal hierarchy 303 is assigned 100% of metal layers M1, M2, and M3, 50% of metal layers M4 and M5, and 20% of metal layer M6; and parent metal hierarchy is assigned 50% of metal layers M4 and M5, 80% of metal layer M6, and 100% of metal layers M7, M8, and M9.

TABLE 1

Example First Child and Parent Metal Contract

| | C1 | P |
|---|---|---|
| M1 | 100% | 0% |
| M2 | 100% | 0% |
| M3 | 100% | 0% |
| M4 | 100% | 0% |
| M5 | 80% | 20% |
| M6 | 80% | 20% |
| M7 | 50% | 50% |
| M8 | 0% | 100% |
| M9 | 0% | 100% |

TABLE 2

Example Second Child and Parent Metal Contract

| | C2 | P |
|---|---|---|
| M1 | 100% | 0% |
| M2 | 100% | 0% |
| M3 | 100% | 0% |
| M4 | 50% | 50% |
| M5 | 50% | 50% |
| M6 | 20% | 80% |
| M7 | 0% | 100% |
| M8 | 0% | 100% |
| M9 | 0% | 100% |

Figure 4:
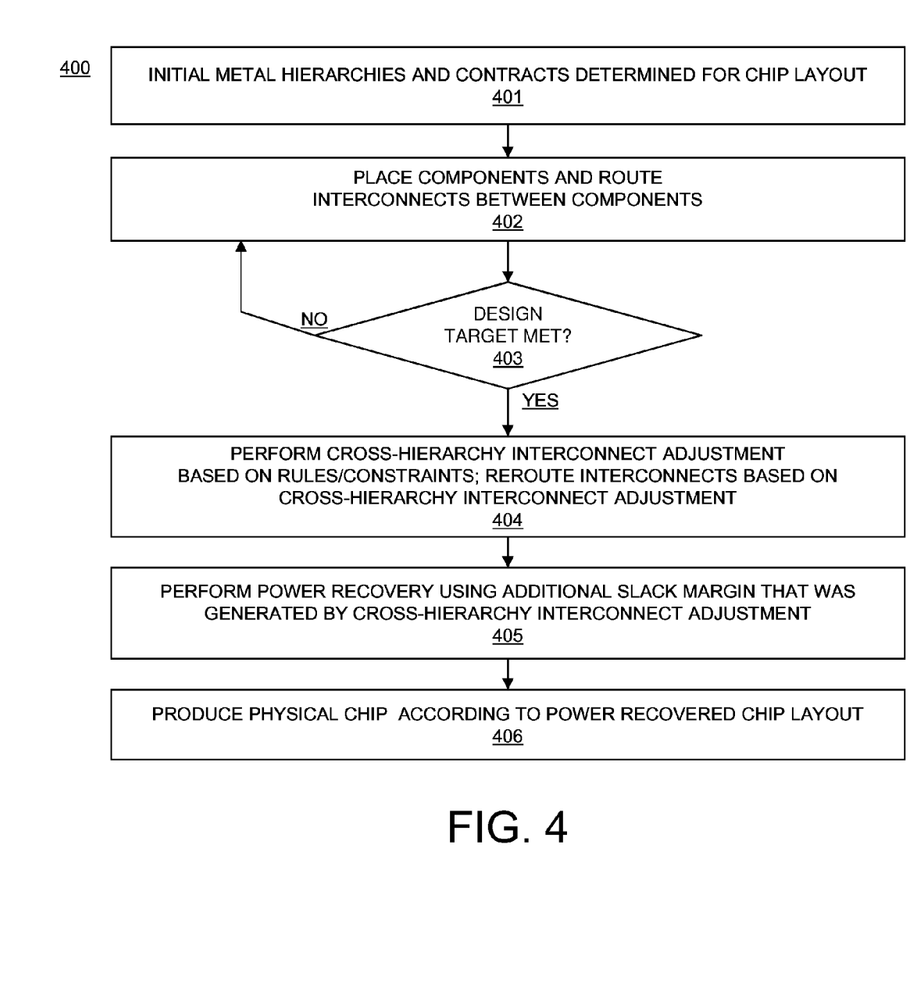
FIG. 4 depicts a process flow for cross-hierarchy interconnect adjustment for power recovery in accordance with an embodiment.

FIG. 4 illustrates an embodiment of a method 400 for cross-hierarchy interconnect adjustment for power recovery. First, in block 401, an initial chip layout, including the metal hierarchies, for a chip design are determined. An example of hierarchies that may be determined in block 401 are illustrated with respect to FIG. 3 and Tables 1 and 2. Subsets of the components of the chip are assigned to the various hierarchies. Subsets of the metal stack are also assigned to the various hierarchies to use for interconnecting each hierarchy's respective components. Metal contracts are determined between the various hierarchies. Then, in block 402, the components of the chip are placed, and interconnects are routed between the components according to the metal hierarchies and contracts. For components that are assigned to a particular hierarchy, only the metal resources that are contractually assigned to that hierarchy are used to route interconnects between those components. In some embodiments, the higher-level metal resources, having a lower RC value, are assigned to the parent hierarchy, and the lower-level metal resources, having a higher RC value, are assigned to the child hierarchies. In block 402, performance and routability are balanced against each other. For example, shorter interconnects are faster; however due to physical placement feasibility, some interconnects may need to be relatively long. Next, in block 403, it is determined whether predetermined timing requirements for the chip design are met by the placement and routing that was performed in block 403. If it is determined in block 403 that the predetermined timing requirements are not met, flow returns to block 402, and placement and rerouting are redone in order to attempt to meet the predetermined timing requirements. Blocks 402 and 403 are repeated until the predetermined timing requirements for the chip are met in block 403.

Then, flow proceeds to block 404, in which cross-hierarchy interconnect adjustment is performed. Unused metal resources having a relatively low RC value (e.g., towards the top of the metal stack) are identified, and are reassigned to hierarchies that are assigned to metal resources that have a higher RC value. For example, metal resources that are assigned to the parent hierarchy but are unused, based on the routing and placement that was performed in block 402, may be reassigned to a child hierarchy. Localized grid-based analysis of the parent hierarchy metal stack availability may be performed to determine unused parent metal resources. The cross-hierarchy interconnect adjustment is performed in block 404 based on various predetermined rules and constraints. The rules and constraints for cross-hierarchy interconnect adjustment may be defined in terms of slack, congestion, engineering change order (ECO)-ability, interconnect length, and component driver and load profile. Lower and upper limits on interconnect lengths that may be remapped to a higher layer may be set. The parent hierarchy may have additional metal reservation requirements for congestion scenarios in the chip that are taken into account in some embodiments. For each interconnect that is determined to be a candidate to be moved to another metal level, a slack improvement threshold that would be made possible by the move is compared to a current slack of the interconnect. For each component that is affected by moving an interconnect, the driver, pre-driver and load device profile is evaluated before moving the interconnect. In block 404, one or more interconnects may be moved from a lower metal layer that was assigned in block 402 to a higher metal layer that was assigned to a different hierarchy but is unused based on the placement of block 402, generating additional slack margin in the chip design due to the higher metal layers providing faster interconnects. The cross-hierarchy interconnect adjustment process may have a predetermined slack margin improvement target in some embodiments.

Then, in block 405, power recovery is performed on the components of the chip design 405 using the additional slack margin that was generated in block 404. In some embodiments, power recovery in block 405 is performed on the components of the chip design completely separately after the cross-hierarchy interconnect adjustment that was performed in block 404. In other embodiments, the cross-hierarchy interconnect adjustment of block 404 is performed as a part of post-routing design optimization, in which the power down algorithm can see additional interconnect availability at the parent hierarchy level on-the-fly and can use any available parent metal resources while doing power recovery, e.g., simultaneous device-interconnect optimization. Lastly, after power recovery is performed, in block 406, a physical chip is fabricated based on the power-recovered chip layout data that was determined by the processing of blocks 401-405.

Figure 5:
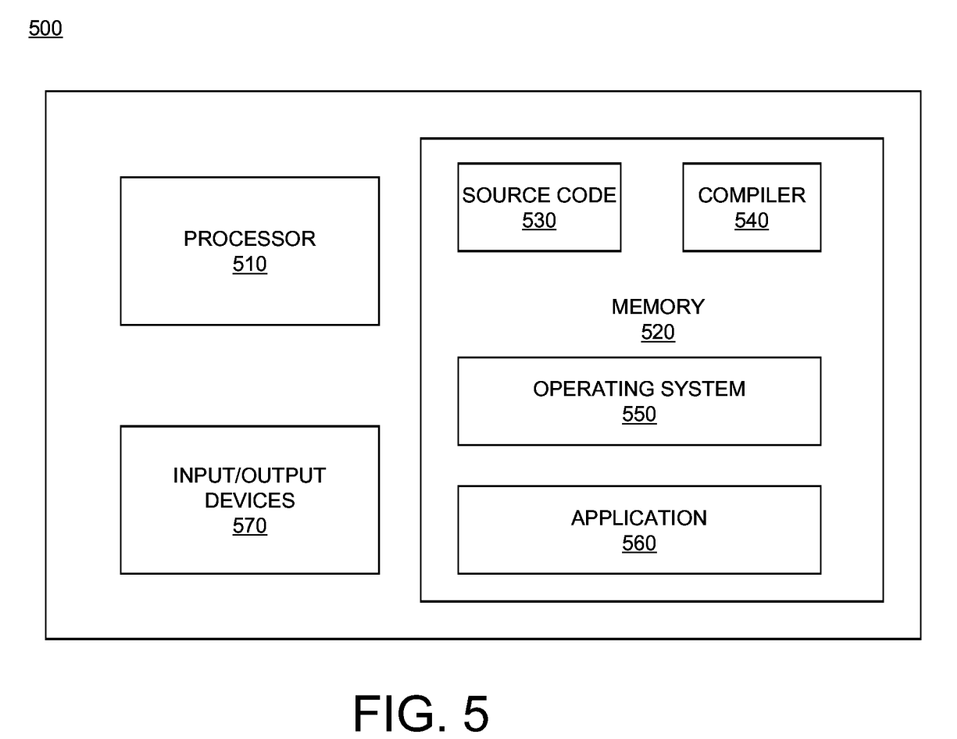
FIG. 5 depicts an example of a computer that may be used in conjunction with embodiments of cross-hierarchy interconnect adjustment for power recovery.

FIG. 5 illustrates an example of a computer 500 which may be utilized by exemplary embodiments of cross-hierarchy interconnect adjustment. Various operations discussed above may utilize the capabilities of the computer 500. One or more of the capabilities of the computer 500 may be incorporated in any element, module, application, and/or component discussed herein.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more I/O devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 560 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include timing gains and reduced power consumption in a chip.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for cross-hierarchy interconnect adjustment, the method comprising:
   determining a chip layout data corresponding to a chip design the chip layout data comprising a plurality of chip components, a first hierarchy comprising a first subset of the plurality of chip components, and a second hierarchy comprising a second subset of the plurality of chip components;
   determining metal contracts between the first hierarchy and the second hierarchy, wherein a first portion of a metal stack of the chip design is assigned to the first hierarchy and a second portion of the metal stack is assigned to the second hierarchy based on the contract between the first hierarchy and the second hierarchy;
   receiving chip layout data and placing the plurality of chip components based on the first hierarchy, the second hierarchy and the contract;
   routing interconnects between the plurality of chip components by assigning higher-level metal resources to a parent hierarchy and lower-level metal resources to the first hierarchy and second hierarchy, the higher-level metal resources having a first RC value and the lower-level metal resources having a second RC value, the second RC value being larger than the first RC value;
   determining a timing parameter based on the placement of the plurality of chip components, the assignment of higher-level meter resources and routing of interconnects;
   determining when the timing parameter is less than or equal to a predetermined threshold;
   changing the placement of the plurality of chip components and routing of interconnects based on the timing parameter being greater than the predetermined threshold;
   determining an unused portion of the first portion of the metal stack;

moving an interconnect of the second hierarchy from the second portion of the metal stack that is assigned to the second hierarchy to the unused portion of the first portion of the metal stack in the chip layout data, the movement of the interconnect being based on an RC value, slack, congestion, interconnect length and load profile; and performing power recovery on the chip layout data after moving the interconnect based on an amount of slack margin generated in the chip design by the moving of the interconnect; and fabricating a physical chip based on the chip layout data after performing the power recovery.

\* \* \* \* \*